Nov. 20, 1956 H. WEESE 2,770,864
METHOD FOR PRODUCING A SURFACE OF DESIRED
CONTOUR ON A MOLDABLE SUBSTANCE
Filed Dec. 10, 1952 3 Sheets-Sheet 3
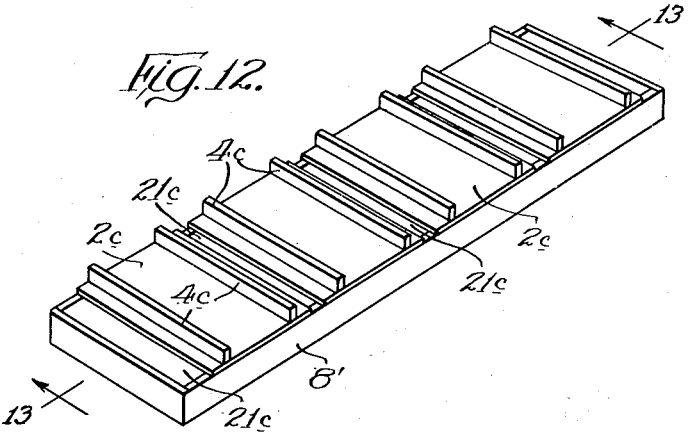
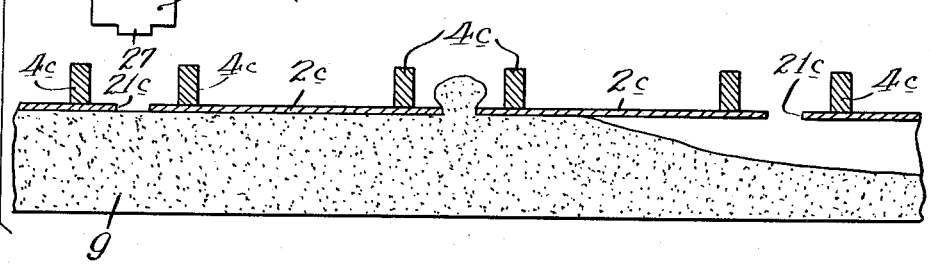
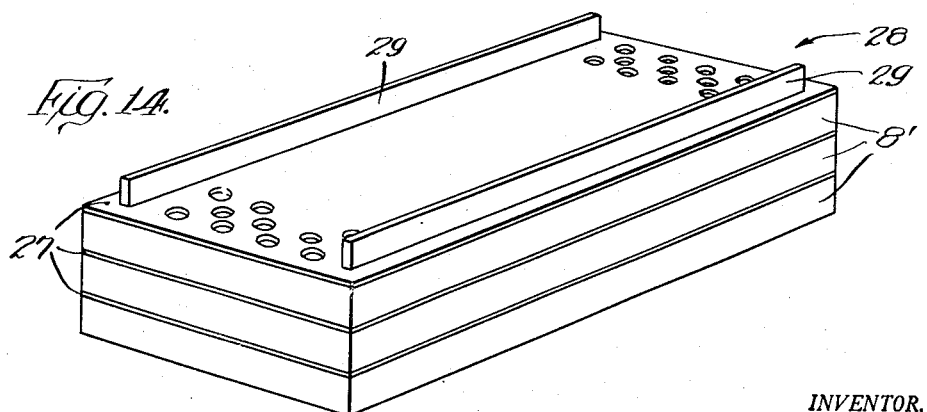
INVENTOR.
Harry Weese
BY
*Attys.*

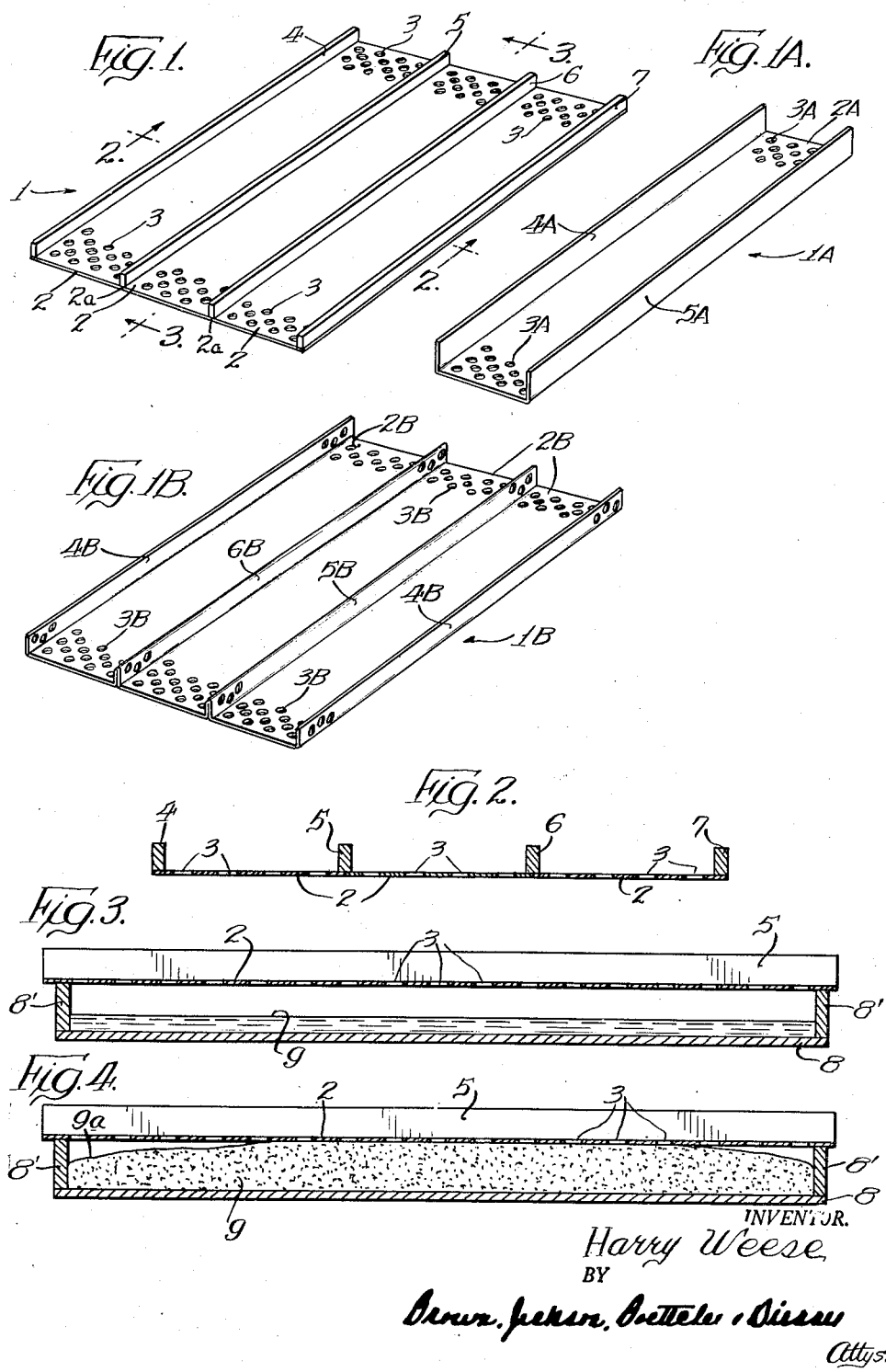

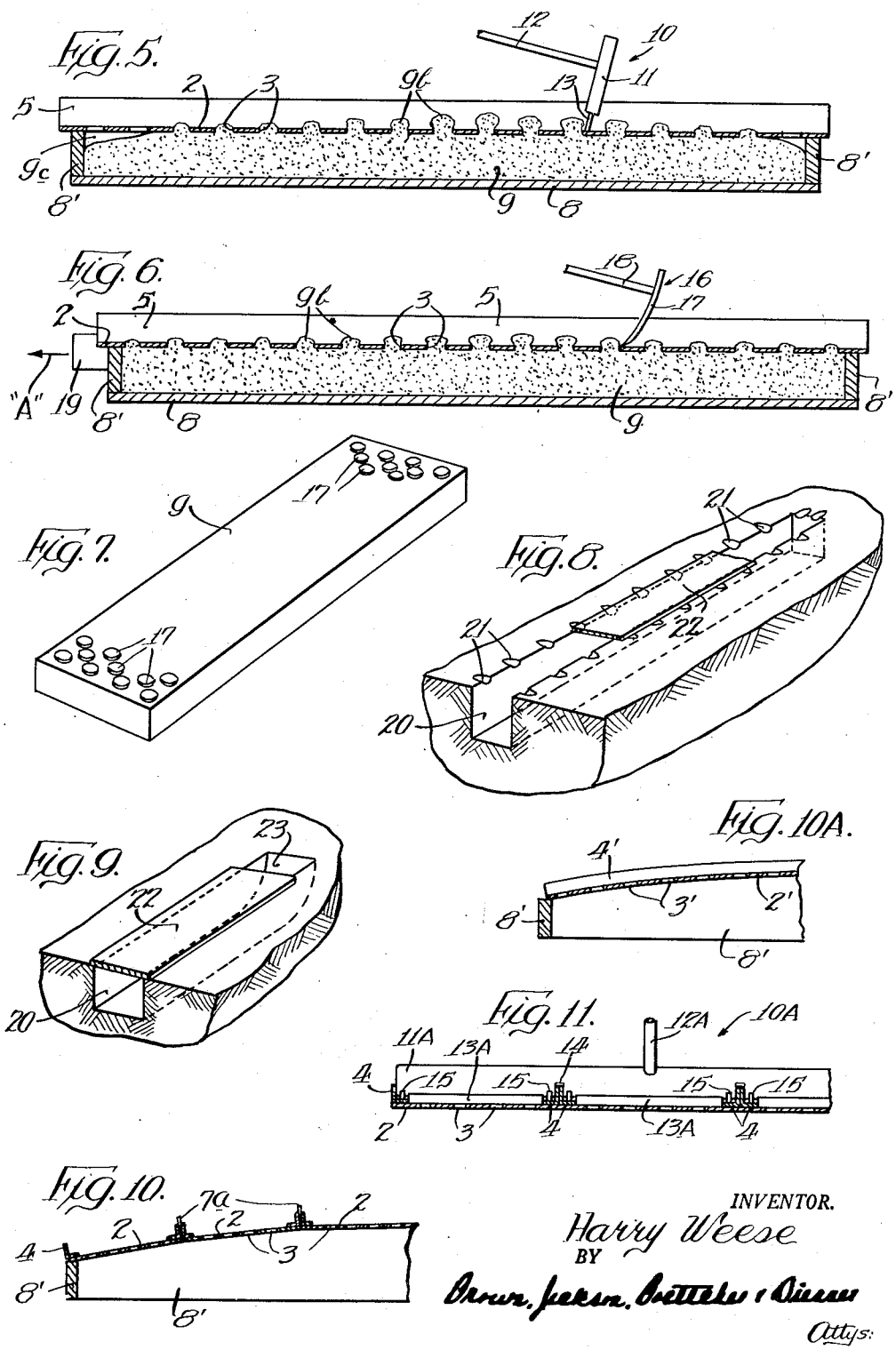

United States Patent Office 2,770,864
Patented Nov. 20, 1956

2,770,864

METHOD FOR PRODUCING A SURFACE OF DESIRED CONTOUR ON A MOLDABLE SUBSTANCE

Harry Weese, Chicago, Ill.

Application December 10, 1952, Serial No. 325,099

1 Claim. (Cl. 25—155)

This invention relates generally to a method for producing a surface of desired contour on moldable substances. More particularly, it is directed to forming surfaces, such as plane surfaces, for example, on structures made of self-rising materials, self-rising cellular concrete being one such material. While the invention in its broad concepts is not limited to such concrete, nor to producing a plane surface thereon, it is well adapted therefor and will, for convenience, be described in that connection.

There has been developed in recent years a cement product having such characteristics that in the process of setting it rises two to two and one-half times the level of the original slurry. It is a light-weight cellular product having a plastic base and is very good for insulation purposes and also has adequate structural strength. One brand of this product is called "Thermo-con." It is used for structural purposes, for example, floors, walls, partitions, roofs, and roadbeds. It may be cast in situ or may be cast on a flat bed or in layers and lifted in place by hoists, jacks, or cranes.

There has developed in the use of this product the problem of equalizing and screeding the unstable expanding material in its plastic state so that it will set with the desired contour on its top surface, for example, a plane surface, and accomplish this without breaking down the cell structure. The poured batch of concrete tends to rise in an irregular manner, for example, it may rise farther in the middle than it does at its borders leaving a generally rounded top surface which is objectionable for most uses.

One object of this invention is to provide a method of casting self-rising concrete, or other moldable substance, so that the resulting product will have a surface of the desired contour, such, for example, as a plane upper surface.

Other objects, uses, and advantages will be obvious or become apparent from a consideration of the following description when taken in conjunction with the drawings in which:

Figure 1 is a view in perspective of a typical screen unit forming part of this invention;

Figure 1A is a modification of the unit shown in Figure 1;

Figure 1B is a perspective view of another modification of the screen unit shown in Figure 1;

Figure 2 is a cross sectional view, along line 2—2, of the screen unit shown in Figure 1;

Figure 3 is a cross sectional view, along line 3—3, of the screen unit shown in Figure 1 with the unit in place on a mold form and showing the level of the original slurry immediately after it has been poured;

Figure 4 is similar to Figure 3 showing the position of the concrete in respect to the screen unit after the rising has commenced;

Figure 5 is similar to Figure 3 showing the effect of the screen unit on the rising concrete, together with a wiper device which forms a part of this invention;

Figure 6 is similar to Figure 3 but shows a modification in which the concrete has set and a scraper unit is used to break off the extruded material;

Figure 7 is a perspective view of a finished concrete slab obtained as the result of the application of one form of my invention;

Figure 8 is a perspective view, partially in section, showing the method of my invention employed in connection with a mold cavity or form, constructed in the earth, or like material, and with an imperforate plate, fragmentarily shown, overlying said form;

Figure 9 is a perspective view, partially in section, showing a modified mold cavity, or form, constructed in the earth;

Figure 10 is a sectional view showing a series of flat screens on a mold form used to form a crowned upper surface for a concrete road;

Figure 10A shows a sectional fragmentary view of a modified screen used in forming a crowned upper surface for a concrete road;

Figure 11 shows a multiple wiper used for removing or shifting the concrete which has been extruded through the perforations in a screen unit;

Figure 12 is a perspective view of a modification of the invention wherein spaced imperforate plates, or cover members, are placed over a form;

Figure 13 is an enlarged fragmentary sectional view on the line 13—13 of Figure 12 showing molding material extruding between the plates; and Figure 14 is a perspective view of a modification of the invention wherein the cast material is permitted to rise up through a plurality of perforated plates to produce a plurality of cast members in one pouring operation.

Referring to the drawings, a typical screen unit 1 shown in Figure 1 comprises three metal plates or screens 2 joined together in abutting side-by-side relationship as at 2a, though obviously the number of plates joined together will be determined by the size of the job. The plates are perforated as at 3 by any well-known means. Secured to screens 2 on the longitudinal outside ends of each are reinforcing bars, 4, 5, 6 and 7. These bars 4, 5, 6 and 7 may be two-by-fours or metal angle bars. Bars of adjoining screens may be joined back to back in the case of metal angle bars. The bars may be rigidly secured to the respective screens by any well-known means such as by bolts, if two-by-fours are used, or by welding if angle irons are used. If two-by-fours are used, one two-by-four may serve to join margins of two screens together, as is best shown in Figure 2. For example, bars 5 and 6 are placed is overlapping relationship with respect to the screens 2 whose edges they reinforce, while on the outermost longitudinal edges of the outside plates or screens the bars are secured adjacent and flush with such edges.

Whether the structure desired consists of a slab, panel, post or the like, its dimensions will be known and the form into which the slurry is discharged for the casting operation will establish an enclosure of the proper dimensions and the covering plate, or screen, will be disposed, preferably, as a top surface or wall means on the form. The person then pouring the slurrry will keep in mind that the material will rise from 2 to 2½ times its original poured height so that approximately the desired amount of slurry will be introduced into the form. The amount introduced preferably will provide, when fully risen, a volume somewhat in excess of the volume of the form, so that the entire form will be filled.

It has been found from experimentation that, if the typical screen unit 1 is 144 inches long by 36 to 48 inches wide and if enough round perforations of a diameter of from ½ to 1 and ½ inches are made in 16 to 20 gage plate metal so that the metal plates are 35% to 50% open, the result is a highly efficient device. Obviously, the perforations need not be round and their dimensions and positions relative to each other, as well as the dimensions of the screen unit and its bars, may be varied.

It will be observed that the metal plates or screens 2 are shown with a plane under surface. It will be appreciated, however, that in certain constructions, such as forming a roadway wherein a slight crown on the road is desired, that the under surface of the plates, either singly or taken collectively, may provide a slight arc in order to establish the appropriate crown to the road. This crown effect can, however, be achieved to some extent by a series of screens having completely planar under surfaces with said screens being tipped slightly at an angle with respect to each other as is shown in Figure 10, wherein the angle of tipping is exaggerated. In such constructions, it may be helpful not only for the forms to be inclined to accommodate the screens in relative angular positions but it may also be desirable to have spacer members, such as are indicated by the reference numeral 7a, disposed between the bars of adjoining screens. In Figure 10A the screen 2' is shown running transversely to the direction of the screen unit 2 of Figure 10. Screen 2', reinforced by bar 4', is curved slightly to provide a curved under surface which provides for a crown to the concrete roadway which will be poured.

Figure 1A discloses a metal screen unit 1A consisting of a single metal plate 2A perforated by holes 3A and reinforced along its outer longitudinal edges by bent-up margins 4A and 5A, which may be unperforated and which may serve in place of two-by-fours or angle irons. This unit is more suited to the requirements of an infrequent user of the concrete, but may be used in the manner described below for the preferred typical unit 1.

Figure 1B shows a screen unit 1B consisting of a single metal plate, or sheet, 2B perforated by holes 3B and reinforced along its edges by bent-up margins 4B. Intermediate the bent-up margins 4B the screen is reinforced by having intermediate portions of the screen bent vertically up and then back down to provide strengthening ribs 5B and 6B. The whole sheet may first be perforated and may then be formed with the ribs 4B, 5B and 6B. If preferred, the sheet may be left unperforated at those intermediate portions and margins which will be used to form the strengthening ribs or bars 4B, 5B and 6B.

Referring to Figures 1 through 5, the unit 1 is to be placed above the bed 8 by resting it upon the upper surface of mold form members 8' in such a manner that the perforated plates completely cover the area in which the concrete is poured, as shown in Figure 3. The screen unit may be set over the concrete slurry 9 during or after the pouring or casting thereof. If placed on the form before pouring of the concrete, some suitable entrance for the slurry will be formed in the form or screen. After the concrete has started to rise, the upper surface will be similar to that shown in Figure 4 and, if the concrete were allowed to completely dry in this shape, the difficulties of working with the outer surface 9a are numerous and obvious to one skilled in the art.

As the rising slurry contacts the under surface of the screen, the concrete tends to extrude through perforations 3 as at 9b (Figure 5). At this stage, if desired, a wiper member 10 may be brought into action by the worker to redistribute the extruded concrete into hollow spaces, such as spaces 9c along the sides of the forms 8, by wiping and pressing the extruded material downwardly through the apertures 3 which overlie the hollow spaces 9c. This wiper member may be of any convenient type but preferably is of the squeegee type having a relatively long handle 12 to be grasped by the user, a head 11 and a flexible blade 13 which is slid along the upper surface of screens 2 as the concrete extrudes through the perforations 3. This wiper 10 moves the extruded concrete toward the areas of the screens 2 which are above hollow spaces such as at 9c. It is to be seen that in such operation the optimum amount of slurry which is cast will be such that the excess of concrete extruding through perforations 3 will fill the hollow places 9c.

It is also desirable, though by no means necessary, that the head member 11 be of such width that the bars 4, 5, 6 and 7 may serve as guides for the wiper 10. Thus, in one form, the head 11 will be slightly shorter than the distance between bar members 4 and 5 which latter distance may also be equal to the distances between members 5 and 6 and members 6 and 7. These reinforcing members 4, 5, 6 and 7 will then be serving two functions, that is, as a reinforcement and guiding means.

In another form, the wiper 10A may take the shape shown in Figure 11 where it is shown as extending across several screens and being guided by their reinforcing bars 4 by means of the notches 14 in the head 11A. This multiple wiper may be actuated by hand, but in extensive casting operations such as a roadway, could be mechanically powered and could incorporate rollers 15 for riding on the flanges of bars 4, or for riding on the upper edges of the reinforcing bars. Flexible blades 13A may be dispensed with, if desired, by substituting metal, which, for example, may be a portion of the head 11A.

While the use of the apparatus, as described above—wherein the casting material is poured, either before, after, or during the time the screen unit 1 is put in place, then is allowed to rise so that the excess extrudes through perforations 3, and then wiper 10 is used to redistribute the excess material to hollow portions 9c and completely remove any excess left after these hollow portions are filled—is satisfactory for many moldable materials, I prefer a somewhat different procedure for the self-rising cellular concrete.

With such concrete, instead of redistributing the extruded portion of the plastic concrete by the wiper 10, the slurry preferably is permitted to rise to such an extent that it engages the under surface of the screen over its entire area and then any excess extruded part is completely removed. The excess may be pushed into the next mold, if desired. Such procedure is preferable, with the type of self-rising concrete above described, since there is then less likelihood of the cellular structure being weakened.

After removal of the excess concrete and after the concrete 9 has taken its set, the screen unit 1 is removed leaving a plane surface slightly dimpled by reason of the perforations 3, as shown at 17 in Figure 7. The dimpled portions provide not only an ornamental effect but also roughened areas which will assist the bonding of plaster, paint, etc., to the entire surface.

As an alternative way of removing the excess extruded material, after the concrete has partially or fully set the extrusions 9b may be broken off by means of a suitable scraper, or breaker, 16 having a blade, or head, 17 and a handle 18 (Figure 6). The blade 17 may also be of such width that the bar members 4, 5, 6 and 7 will serve as guide members therefor. The screen unit 1 will then be removed as described above, leaving a substantially plane surface.

Another method for removing the extrusions 9b is to use the screen itself as a severing means by moving it longitudinally of the form 8, 8' (see the directional arrow "A" of Figure 6). Such severance takes place preferably after the material has taken at least a partial set. To assist in such severance there may be employed, if desired, guide means such as the plates 19 (Figure 6) which are fastened to opposite sides of side forms 8'.

The preferred method, however, is to "squeegee," or wipe off, the extruded portions 9b while the concrete is still moist.

A variation on the casting methods disclosed above is illustrated best by Figures 8 and 9 wherein, instead of a wooden or metal form, a cavity, or form, 20 may be constructed in the earth and the surface therealong made level or substantially so. Exit means, for excess casting material, in the form of grooves 21, for example, may extend outwardly from the mold. The mold or form 20, together with top wall means 22 in the form of a plate, board, or the like, forms an enclosure into which the slurry of concrete will be discharged and confined. In lieu of having the plate or board 22 perforated to permit extrusion of the excess concrete, upon rising, the concrete may discharge through the grooves 21. This excess may be later removed while still plastic, or, if set, may be broken off, for example, by taking the same plate 22 and inserting it between the edge of the cast concrete and the earthen mold.

A further variation employing an earthen mold 20 and top wall means in the form of an imperforate plate 22 is shown in Figure 9 wherein the plate 22 is disposed over the hollowed opening in the earth, thereby forming an enclosure, and the concrete is introduced from one or the other of the ends of the mold 20. An end of the mold 20 may be curved or tapered downwardly as at 23 to serve not only as an entrance for the slurry but as a means for providing an exit for the excess concrete after the risen concrete has engaged the undersurface of the plate 22. However, in the case of self-rising concrete, such as that described above, it is thought best not to require too great a distance for excess concrete to be displaced in reaching some exit means. Otherwise, the normal development of the cellular structure may be interfered with.

In Figures 12 and 13 another modification of the invention is shown wherein exit means in the form of narrow slots, or spaces, 21c are located between adjacent imperforate plates 2c which rest on the side mold forms 8'. The series of plates 2c and slots 21c may be considered in the aggregate as a perforated surface. The plates may have reinforcing ribs 4c at their margins if needed. In Figure 13, which is an enlarged fragmentary sectional view, successive stages of the method are shown, viewed from right to left. The slurry rises, then extrudes through spaces 21c, and then is scraped off by the wiper, or screeding device, 24 having a handle 25 and head 26 with a downwardly extending tongue 27. Tongue 27 preferably has a width and depth corresponding to the width and depth of the spaces, or slots, 21c between plates. The width of the head should, of course, not exceed the distance between reinforcing ribs 4c which lie adjacent the slots 21c.

In Figure 14 a plurality of perforated screens 27 may be set on a succession of side forms 8' of a multiple mold 28. One or more of the screens may have stiffening, or reinforcing ribs 29, if desired. The ribs may fit within, and closely adjacent the inner sides of the side molds 8'. This arrangement of a plurality of perforated screens is feasible when the structures to be cast are not too thick. The concrete, in rising, passes upwardly through the perforations of successive screens and then the excess extruded through the top screen may be handled in any of the manners described above. Withdrawal of the intermediate screens will sever the connections between structures.

In the use of any of the apparatus the screens or plates may be fastened to the side forms—or, in Figures 8 and 9, to the ground—in a suitable manner, if desired. However, that is not necessary since the weight of the screens or plates, alone, or with sacks of concrete, etc., resting on boards extending across the reinforcing bars, is sufficient to carry on the casting operation in a practical manner.

Preferably, in all forms of practicing the method and in all forms of the apparatus, the exit means for excess material will be adjacent the top of the enclosure or mold form rather than lower down, since it is desired that the concrete rise against the under surface of the top wall means. It is even more desirable if the exit means, in the form of perforations or otherwise, are more or less evenly distributed adjacent, or in, the top wall means.

A further advantage of the screen units above described is that laitance normally encountered along the wooden form members of the mold is minimized since the contact of the rising slurry with the under side of the screen is gradual and there is a substantial area of open work so sudden drying of the surface of the material thereby is avoided.

While I have illustrated and described several embodiments of the invention it is not intended to limit the scope of the invention thereto, except insofar as the claim is so limited, since variations and modifications coming within the scope of my invention will be readily suggested to one skilled in the art by reason of this disclosure.

I claim:

A method for producing a plane surface on structures made of self-rising concrete which comprises pouring the concrete into a mold, allowing the concrete to rise and extrude through a plane perforated surface, wiping the extrusions, redistributing the extruded concrete to hollow places and removing excess concrete.

References Cited in the file of this patent

UNITED STATES PATENTS

| Number | Name | Date |
|---|---|---|
| Re. 18,844 | Slidell et al. | May 30, 1933 |
| 419,609 | Mayer | Jan. 14, 1890 |
| 774,005 | Thies | Nov. 1, 1904 |
| 965,909 | Jordan | Aug. 2, 1910 |
| 1,026,117 | Parkhill | May 14, 1912 |
| 1,156,077 | Higgins | Oct. 12, 1915 |
| 1,182,061 | Trumble | May 9, 1916 |
| 1,213,982 | Von Hassel | Jan. 30, 1917 |
| 1,235,542 | Bagby | Aug. 7, 1917 |
| 1,245,477 | Loxterman | Nov. 6, 1917 |
| 1,295,735 | Grundmann | Feb. 25, 1919 |
| 1,345,904 | Wishart | July 6, 1920 |
| 1,399,977 | Merele | Dec. 13, 1921 |
| 1,472,646 | Glenn | Oct. 30, 1923 |
| 1,518,581 | Hellyer | Dec. 9, 1924 |
| 1,579,961 | Shope | Apr. 6, 1926 |
| 1,627,266 | Beale | May 3, 1927 |
| 1,634,900 | Fuller | July 5, 1927 |
| 1,831,982 | Wagner | Nov. 17, 1931 |
| 1,937,993 | Stees | Dec. 5, 1933 |
| 1,951,344 | Caldwell | Mar. 20, 1934 |
| 1,988,315 | Jackson | Jan. 15, 1935 |
| 2,003,988 | Angier | June 4, 1935 |
| 2,008,162 | Waddell | July 16, 1935 |
| 2,009,984 | Billner | July 30, 1935 |
| 2,047,356 | Boyle | July 14, 1936 |
| 2,124,086 | Slidell | July 19, 1938 |
| 2,161,308 | Murphy et al. | June 6, 1939 |
| 2,175,715 | Denning | Oct. 10, 1939 |
| 2,206,757 | Talalay | July 2, 1940 |
| 2,394,943 | Stancliffe | Feb. 12, 1946 |
| 2,522,116 | Hayes | Sept. 12, 1950 |

FOREIGN PATENTS

| Number | Country | Date |
|---|---|---|
| 539,786 | Great Britain | Sept. 24, 1941 |
| 752,873 | France | July 31, 1933 |